US008712591B2

(12) United States Patent
Receveur

(10) Patent No.: US 8,712,591 B2
(45) Date of Patent: Apr. 29, 2014

(54) CONSTANT LOW-FLOW AIR SOURCE CONTROL SYSTEM AND METHOD

(75) Inventor: Timothy J. Receveur, Guilford, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 13/600,831

(22) Filed: Aug. 31, 2012

(65) Prior Publication Data

US 2012/0330467 A1 Dec. 27, 2012

Related U.S. Application Data

(63) Continuation of application No. 12/622,283, filed on Nov. 19, 2009, now Pat. No. 8,260,475.

(51) Int. Cl.
*G06F 19/00* (2011.01)

(52) U.S. Cl.
USPC ............ 700/282; 700/301; 5/413 AM; 5/681; 5/706; 5/713; 5/654; 5/655.3

(58) Field of Classification Search
USPC ........... 5/413 AM, 681, 706, 713, 654, 655.3; 700/239, 282, 301
See application file for complete search history.

(56) References Cited

U.S. PATENT DOCUMENTS 4,037,598 A 7/1977 Georgi
4,352,048 A 9/1982 Schulze
4,417,312 A 11/1983 Cronin
4,498,036 A 2/1985 Salemka
4,563,175 A 1/1986 LaFond
4,628,499 A 12/1986 Hammett
4,806,833 A 2/1989 Young
4,905,687 A 3/1990 Ponkala
4,975,628 A 12/1990 Lemieux
4,980,793 A 12/1990 Glowczewski et al.
5,022,587 A 6/1991 Hochstein
5,032,772 A 7/1991 Gully
5,106,268 A 4/1992 Kawamura
5,107,713 A 4/1992 Peck et al.
5,448,141 A 9/1995 Kelley et al.
5,599,174 A 2/1997 Cook et al.
5,632,155 A 5/1997 Sugiyama et al.
5,652,484 A 7/1997 Shafer et al.
5,671,730 A 9/1997 Ollila
5,719,451 A 2/1998 Cook et al.
5,736,823 A 4/1998 Nordby et al.
5,809,157 A 9/1998 Grumazescu
5,833,440 A 11/1998 Berling
5,903,941 A 5/1999 Shafer et al.
5,924,975 A 7/1999 Goldowsky
6,118,239 A 9/2000 Kadah
(Continued)

FOREIGN PATENT DOCUMENTS

GB 2 253 099 8/1992
JP 2223683 9/1990

OTHER PUBLICATIONS

"Introductin to Pulse Width Modulation (PWM)", Michael Barr, The Barr Group, 2007.*

*Primary Examiner* — Michael D Masinick
(74) *Attorney, Agent, or Firm* — Barnes & Thornburg LLP

(57) ABSTRACT

A constant low-flow air source control system and method is used to operate a pump to inflate an inflatable support structure used to support a person.

21 Claims, 6 Drawing Sheets

(56) References Cited

U.S. PATENT DOCUMENTS

| | | | | |
|---|---|---|---|---|
| 6,132,010 | A | 10/2000 | Holt et al. | |
| 6,202,672 | B1 | 3/2001 | Ellis et al. | |
| 6,206,652 | B1 | 3/2001 | Caillat | |
| 6,877,178 | B2 * | 4/2005 | Chapman et al. | 5/713 |
| 7,038,419 | B1 | 5/2006 | Beale et al. | |
| 7,107,642 | B2 * | 9/2006 | Wong et al. | 5/713 |
| 7,277,775 | B2 * | 10/2007 | Teixeira | 700/239 |
| 7,398,803 | B2 | 7/2008 | Newton | |
| 7,500,280 | B2 * | 3/2009 | Dixon et al. | 5/713 |
| 7,685,658 | B2 * | 3/2010 | Lokhorst et al. | 5/424 |
| 2001/0049465 | A1 * | 12/2001 | Goldberg et al. | 600/22 |
| 2002/0082468 | A1 * | 6/2002 | Goldberg et al. | 600/22 |
| 2008/0000028 | A1 * | 1/2008 | Lemire et al. | 5/618 |
| 2008/0005843 | A1 * | 1/2008 | Lokhorst et al. | 5/655.3 |
| 2008/0189865 | A1 * | 8/2008 | Bhai | 5/706 |

* cited by examiner

CONSTANT LOW-FLOW AIR SOURCE CONTROL SYSTEM AND METHOD

CROSS REFERENCE TO RELATED APPLICATIONS

This application is a continuation, and claims the benefit under 35 U.S.C. §120, of U.S. application Ser. No. 12/622,283, filed on Nov. 19, 2009, entitled "CONSTANT LOW-FLOW AIR SOURCE CONTROL SYSTEM AND METHOD," the contents of which are expressly incorporated by reference herein.

BACKGROUND OF THE INVENTION

The present disclosure is related to person support apparatuses that include inflatable support structures. More specifically, the present disclosure is related to person support apparatuses including control structures for controlling the rate of inflation of an inflatable support structure.

Person support apparatuses such as beds, and more particularly hospital beds, are known to include one or more inflatable support structure(s) for supporting at least a portion of person on the inflatable structure. The pressure in the inflatable structure may be varied to change the interface pressure exerted on the skin of the person supported on the inflatable structure. In some cases, the volume of an inflatable structure is substantial, even while the operating pressures are relatively low. The source of pressurized air used to inflate the support structure may have a sufficient rate of displacement to fill the volume of the structure in only a few minutes. Once filled, the volume of air required to maintain the inflatable structure at the appropriate pressure is significantly lower than that required to initially inflate the structure.

The competing requirements of low flow during normal operating conditions and high flow for the initial fill of the inflatable structure presents a trade-off. A high flow pressurized air source provides for a timely initial fill but has excess capacity during the low fill operation. A low flow pressurized air source on the other hand, may fail to provide, sufficient flow to provide a timely initial fill.

SUMMARY OF THE INVENTION

The present application discloses one or more of the features recited in the appended claims and/or the following features which, alone or in any combination, may comprise patentable subject matter:

According to a first aspect of the present disclosure, a person-support apparatus may include an inflatable support structure, a variable output pump, and a controller. The variable output pump may be in fluid communication with the inflatable support structure and provides a flow of fluid to the inflatable support structure. The controller may be coupled to the variable output pump and includes means for dynamically varying the output of the pump to maintain an output pressure of the pump to a value slightly higher than the pressure in the inflatable support structure during the inflation process to maintain a constant flow from the pump.

The means for dynamically varying the output of the pump may include a circuit for controlling the speed of the pump. The means may also include a processor in electrical communication with the circuit. The processor may be operable to vary the output of the circuit. The means may include a memory device including instructions that, when executed by the processor, cause the processor to control the circuit to vary the output of the pump.

The person support apparatus may further include a first sensor operable to sense a pressure in the inflatable support structure and to communicate a signal indicative of the pressure in the inflatable support structure to the processor.

The processor may process the signal indicative of the pressure in the inflatable support structure. The processor may also vary the output of the circuit based on the current output of the circuit and the signal indicative of the pressure in the inflatable support structure.

The circuit may provide a pulse-width modulated power signal to the variable output pump to vary the operation of the pump to control the pressure output by the variable output pump.

The flow from the pump may be maintained at a substantially constant rate during operation of the pump.

The person support apparatus may include a second sensor operable to sense a pressure at an outlet of the pump and to communicate a signal indicative of the pressure at an outlet of the pump to the processor. The controller may proportionally increase the output of the pump based on the difference in the pressure measured by the first sensor and the second sensor.

According to another aspect of the present disclosure, person support apparatus includes an inflatable support structure, a variable output pump including a driver responsive to a drive signal, and a control system. The variable output pump in fluid communication with the inflatable support structure to transfer fluid to the inflatable support. The control system may include a processor, a sensor in communication with the processor, and a drive circuit. The sensor may be operable to detect the pressure in the inflatable support structure and transmit a pressure signal to the processor indicative of the pressure in the inflatable structure. The drive circuit may be in electrical communication with the processor and the driver of the variable output pump. The drive circuit may be configured to form a drive signal for the driver. The processor may process the pressure signal to determine an optimum operating condition. The processor also may operate the drive circuit to vary the drive signal to cause the pump to transfer fluid to the inflatable support at a substantially constant flow irrespective of the current pressure in the inflatable support structure.

The drive signal may change the rate of displacement of the pump. The pump may be operated such that a pressure gradient between the pump and the inflatable support structure may be substantially constant during operation of the pump.

The drive signal may be a pulse-width modulated to control the rate of displacement of the pump to maintain the constant pressure gradient.

The pump may be operable in a first mode in which the rate of displacement of the pump may be maximized to maximize the flow from the pump and a second mode in which the rate of displacement of the pump may be varied to maintain the substantially constant flow.

The processor may utilize a proportional-integral control routine to determine the drive signal. An integral term of the proportional integral controller may divided by an integral gain factor if the error in the system is within a predetermined tolerance range.

According to yet another aspect of the present disclosure, a method of controlling a variable output pump for inflating an inflatable support structure for a person support apparatus may include operating the pump at a maximum output for a period of time to inflate the inflatable support structure to a target pressure, measuring the pressure in the inflatable support structure, and varying the drive rate of the pump based on changes in the pressure in the inflatable support structure over time to maintain the mass flow rate from the pump to the inflatable support structure a generally constant level over time to maintain the pressure in the inflatable support structure at a value that is substantially the same as the target pressure.

The method may also include determining a time rate of change of pressure in the inflatable support structure, and varying the drive rate of the pump based on the time rate of change of pressure in the inflatable support structure.

The method may still further include using the time rate of change of pressure in the inflatable support structure to determine an error term, calculating an integral term of a proportion integral control based on the error term, calculating an proportional term of a proportional integral control based on the error term, adjusting the gain of the integral term if the error term has a magnitude less than a threshold, and varying the drive rate of the pump based on the proportional integral value.

The method may still further include comparing the pressure in the inflatable support structure to a pressure measured at the outlet of the pump, and proportionally varying the output of the pump based on the magnitude of the difference between the pressure in the inflatable support structure and the pressure measured at the output of the pump.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
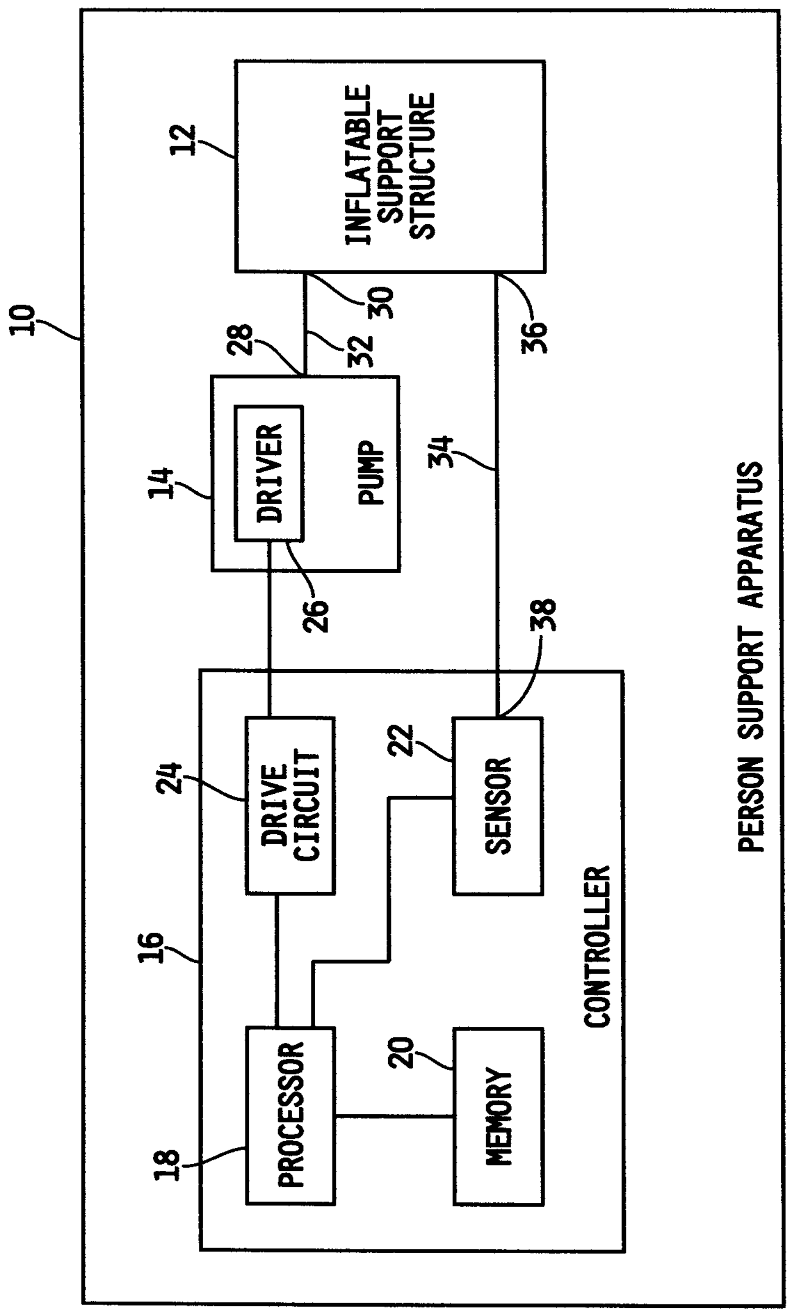
FIG. 1 is a diagrammatic representation of a person support apparatus including an inflatable support structure for supporting at least a portion of a person positioned on the person support apparatus.

A person support apparatus 10, such as a hospital bed, for example is shown in FIG. 1, includes a an inflatable support structure 12, inflated by a variable output pump 14, and a controller 16 that controls operation of the pump 14 to inflate the structure 12. Illustratively, the inflatable support structure 12 may be embodied as an air bladder positioned in a mattress. While the illustrative embodiment shows a single structure 12, it should be understood that in some embodiments multiple inflatable support structures 12 may be fed by a single pump 14. It should also be understood that a valve or manifold structure may be positioned between the pump 14 and structure 12 to open and close a flow path between the pump 14 and structure 12. For example, a valve may be used to prevent back flow from the structure 12 through the pump 14 when the pump 14 is not operating.

The pump 14 communicates pressurized air to the structure 12 through a conduit 32 from an outlet 28 of the pump 14 to an inlet 30 of the structure 12. In the illustrative embodiment pump 14 is a variable displacement diaphragm pump with a direct current (DC) driver 26 which drives the diaphragm to compress air communicated through the conduit 32. In the illustrative embodiment, the driver 26 is a linear motor. The driver 26 is in communication with a drive circuit 24 of the controller 16 with the drive circuit 24 providing power for the operation of the driver 26. Illustratively, the driver 26 can be operated at different drive rates to change the displacement of the diaphragm as the pump 14 oscillates. For example, the drive circuit 24 may provide a pulse-width modulated drive signal to the driver 26 to vary the drive rate of the pump 14. Each oscillation displaces a volume of air which is dependent on the distance of movement, also called displacement, of the diaphragm. The motor controller 16 is operable to control the displacement of the diaphragm by controlling the range of movement of the driver 26. As will be discussed below, the mass flow from the pump 14 may be maintained at a constant level by varying the displacement of the diaphragm as the inflatable support structure 12 is inflated.

It should be understood that various embodiments of variable output pumps may be utilized within the scope of this disclosure. Variable speed, variable displacement, variable volume, variable flow are all terms that are just a few of the terms used to describe a variable output pump. Any pump that may be controlled to vary the pressure and or flow from the pump may be used within the scope of this disclosure. As used herein, the term drive rate designates a variable operational characteristic of a pump including a rate of speed, displacement, output, or flow. The term pump includes compressors, blowers, or other apparatuses that are capable of moving a fluid.

The controller 16 includes a pressure sensor 22 which provides an input to a processor 18. A memory device 20 is included in the controller 16 to store information and instructions to be used by the processor 18. The controller 16 further includes a drive circuit 24 which provides a drive signal to the driver 26 to cause the driver 26 to operate.

Figure 3:
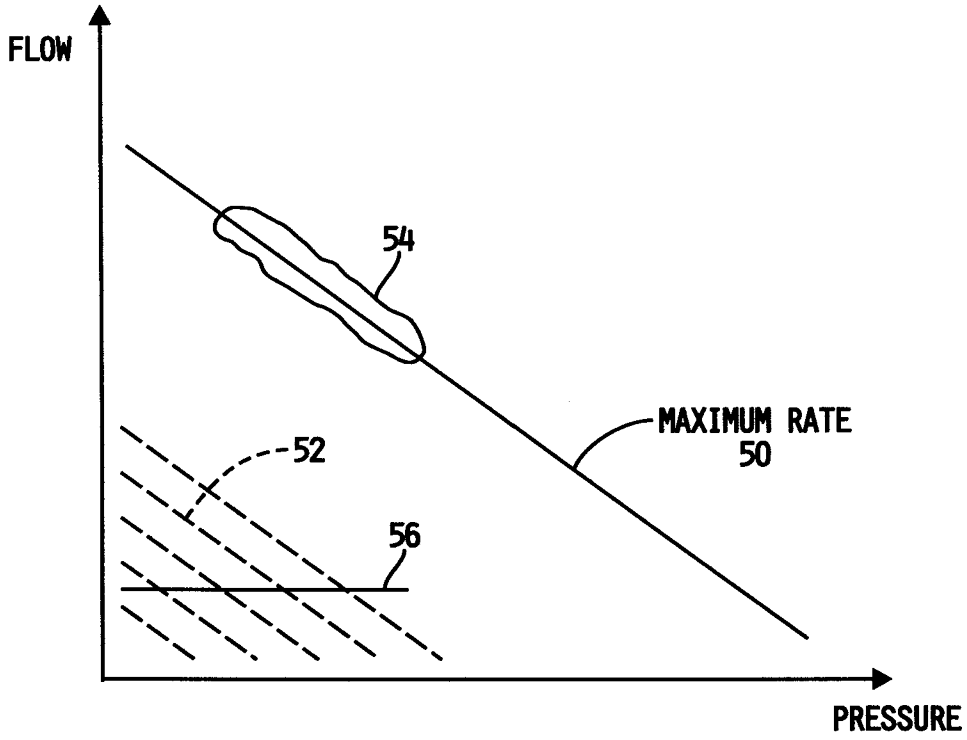
FIG. 3 is a graph of the relationship of pressure and flow as a function of the rate of displacement of a pump.

Referring to FIG. 3, a graph of the relationship of pressure and flow at the outlet of pump 14 is generalized. The line 50 represents a generalized response curve of the rate of flow from the pump 14 as a function of the pressure resisting the flow. The line 50 represents the operation of the pump 14 when driver 26 is operated at a maximum drive rate, thereby producing the maximum displacement of the diaphragm. The region 54 is the typical operating region for pump that has a single output condition. Because there is need for significant flow to fill a bladder, the pump must be oversized to provide sufficient flow. However, the capacity of the pump is excessive as the bladder is only required to operate in the pressures shown in the region 54.

As shown in FIG. 3, the flow from pump 14 decreases as the pressure increases. The flow is dependent, at least in part, on the magnitude of the pressure gradient between the outlet 28 of the pump 14 and the structure 12. Once the pressure gradient reaches approximately zero, such as when the pressure in the structure 12 reaches the maximum operating pressure of the pump 14, there will be no flow between the pump 14 and structure 12. This condition, referred to as “dead head” results in excessive noise from the pump 14. Additionally, maximum displacement of the diaphragm causes the diaphragm to reach mechanical limits, increasing the noise that emanates from the pump 14.

Utilizing a low-flow algorithm, the illustrative variable output pump 14 may be operated at various drive rates as represented by the lines 52. By varying the drive rate, the flow from the pump can be maintained at a substantially continuous rate as represented by the line 56. Operating the pump 14 to maintain continuous flow of line 56 reduces the energy required and heat generated by the pump 14 as well as reducing the noise emitted by the pump.

While the pressure/flow curve shown in FIG. 3 is generalized as a straight line, it should be understood that due to the compressibility of air the curve actually follows a linear differential equation with the flow as a dependent variable and pressure as an independent variable. Using techniques known to those of skill in the art, a particular system may be characterized to establish the relationship between pressure and flow and define certain constants in the differential equation. Once characterized, the specific characteristics of the system may be substituted for the generalized case disclosed herein.

In the illustrative embodiment of FIG. 1, the flow rate through a conduit 32 between an outlet 28 of the pump 14 and an inlet 30 of the inflatable support structure 12 is approximated by the pressure in the inflatable support structure 12, Pstructure. The pressure in the inflatable support structure 12 is measured by a sensor 22 which is in fluid communication with the inflatable support structure 12 by a conduit 39 which is connected to the sensor 22 at an inlet 38 and the inflatable support structure 12 at an outlet 36. At a particular drive rate of driver 26, the volume of air displaced by the pump 14 is known. A comparison of the drive rate of the driver 26 to the pressure in inflatable support structure 12 provides sufficient independent variables to establish the flow rate through conduit 32. The generalized equation is:

$$P\text{out} = \text{Driverate} \times K\text{Structurepressure} \quad (1)$$

where Pout is the pressure at the outlet 28 of pump 14, Driverate is the drive rate of the driver 26, and KStructurepressure is a factor that is determined by characterizing the system to relate the Pout at a given Driverate. It should be understood that Kstructurepressure may be a constant value or may vary with drive rate depending on the particular implementation and characteristics of the pump 14.

The flow rate of air through the conduit 32 can be characterized by the following equation:

$$\text{FlowRate} = (P\text{structure} - P\text{out}) \times K\text{flow} \quad (2)$$

where FlowRate is the flow rate of air through the conduit 32 and Pstructure is the pressure in the inflatable support structure 12. Kflow is a value determined by characterizing the system. Kflow may be a constant value or may vary with drive rate depending on the particular implementation and characteristics of the conduit 32 and inflatable support structure 12. In the generalized case, Kflow may also vary depending on other factors such as Pstructure and the rate of expansion of the inflatable support structure 12. Solving equation 2 for Pout, equation 3 is derived:

$$Pout = Pstructure - \left(\frac{FlowRate}{Kflow}\right) \quad (3)$$

Substituting Pout in equation 1 for Pout in equation 3 and solving for Driverate, the drive rate for the driver 26 can be characterized as:

$$Driverate = \left(\frac{1}{KStructurepressure}\right) \times \left(Pstructure - \left(\frac{FlowRate}{Kflow}\right)\right) \quad (4)$$

In one illustrative embodiment, the FlowRate is to be maintained at a constant level. In a simplified system, the term $$\left(\frac{FlowRate}{Kflow}\right)$$

becomes a constant offset, Offset, based on the target flow rate for the system. Equation (4) can than be generalized as:

$$Driverate = \left(\frac{1}{KStructurepressure}\right) \times (Pstructure - \text{Offset}) \quad (5)$$

The generalized Equation (5) includes a single dependent variable, Pstructure. In some cases, KStructurepressure is a constant value. In other cases, KStructurepressure may be dependent on Pstructure to account for differential effects in the system. Thus, as Pstructure increases, the drive rate of the driver 26 must be increased to maintain the flow through conduit 32 at a constant rate as represented by line 56 in FIG. 3. The drive rate of the driver 26 is represented by the lines 52 on FIG. 3.

After characterization of a system, the Driverate may be controlled so that the minimal flow required may be met while operating the pump 14 at rate less than the maximum drive rate. In the generalized embodiment discussed above, this can be accomplished by measuring a single independent variable, Pstructure, and adjusting the drive rate based on the value of Pstructure.

Figure 2:
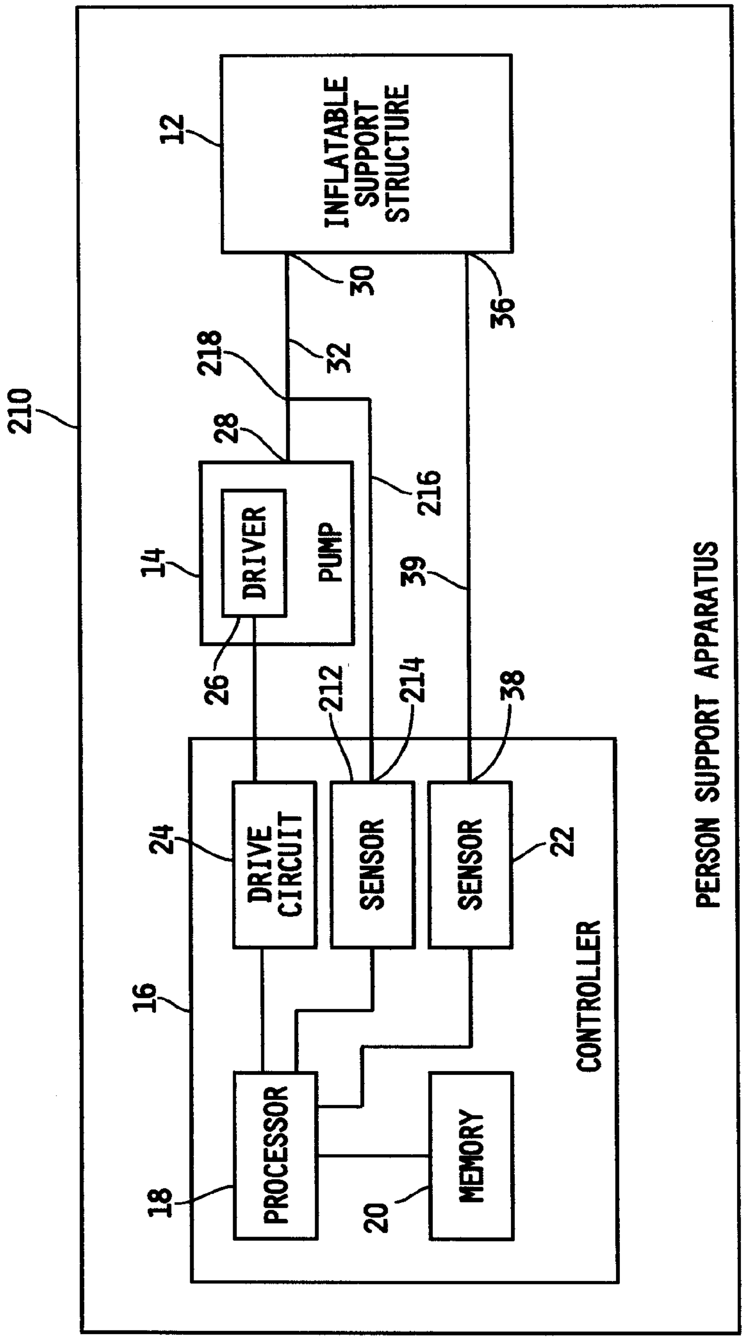
FIG. 2 is a diagrammatic representation of another embodiment of a person support apparatus including an inflatable support structure for supporting at least a portion of a person positioned on the person support apparatus.

In another embodiment of a person support apparatus 210 shown in FIG. 2, the person support apparatus 210 includes a second sensor 212. The sensor 212 communicates via a conduit 216 with the conduit 32 just down the flow stream from the outlet 28 of the pump 14. The conduit 216 is connected to the conduit 32 by a connector 218. The pressure in conduit 32 at the connector 218 is communicated to the sensor 212 which is connected to the conduit 216 by an inlet 214.

In the illustrative embodiment of FIG. 2, the controller 16 is controls the operation of the driver 26 based on the difference in the pressures measured by sensors 22 and 212. The difference in the pressures is indicative of the pressure drop from the pump 14 to the inflatable support structure 12. The flow at any given time is directly related to the pressure drop. By measuring the pressure drop, the controller 16 modifies the operation of the drive circuit 24 to change the drive signal communicated to the driver 26, to vary the Driverate so that the flow is maintained at a substantially constant level. This approach obviates the need to characterize the pump 14 as required with regard to the discussion of the embodiment of FIG. 1. Any real variations in the output of the pump 14 will be measured by the sensor 212 and considered in the calculation of the pressure drop. Thus, the controller 16 can control the Driverate based on a real measurement of the flow from the pump 14 to the inflatable support structure 12 by comparing the two pressures.

In some embodiments, the difference in the pressure measured by sensor 22 is compared to the pressure measured by the sensor 212. In these embodiments, the driver 26 is driven at a proportionally higher drive rate to keep the pressure measured by sensor 212 slightly higher than the pressure measured by sensor 22. By doing so, a minimal pressure gradient between the two is maintained so that there is constantly a minimal flow from the pump 14 to the inflatable support structure 12.

In other embodiments, a change in pressure over time may be used to determine the rate of flow of fluid in the system. By utilizing a change in pressure over time, the Driverate can be modulated to operate at a near constant flow. By considering changes in pressure over time, the system response can be considered in the calculation of the Driverate.

In a system in which the inflatable support structure 12 is a fixed volume and air is used to inflate the structure, the well-known ideal gas equation P×V=n×R×T applies. When assuming constant temperature T a change in P is directly related to the n number of moles present, or, the change in mass. R is a proportionality constant for the specific gas. A change in P over time from $P_1$ to $P_2$ is directly proportional to the change in mass in the volume. In the illustrative case, the volume includes the volume of the inflatable support structure 12 and the conduit 32. It follows that if dP/dt is maintained at a constant level, the dn/dt or the rate of mass change in the system is maintained at a constant level.

In one illustrative embodiment, the rate of flow through conduit 32 is controlled by a proportional-integral-derivative (PID) controller which compares a first pressure value, $P_1$, detected by sensor 22 at a first time, $t_1$, to a second pressure value, $P_2$, detected at a second time, $t_2$, to determine the dP/dt. At a given drive rate of driver 26, dP/dt will decrease over time due to the compression of the air in the system. The increased pressure in the system resists the addition of additional mass into the system by the pump 14. To compensate for this resistance, the drive rate of the driver 26 is increased to increase the rate at which mass is introduced into the system because the pump 14 is pulling ambient air into the system.

Figure 4:
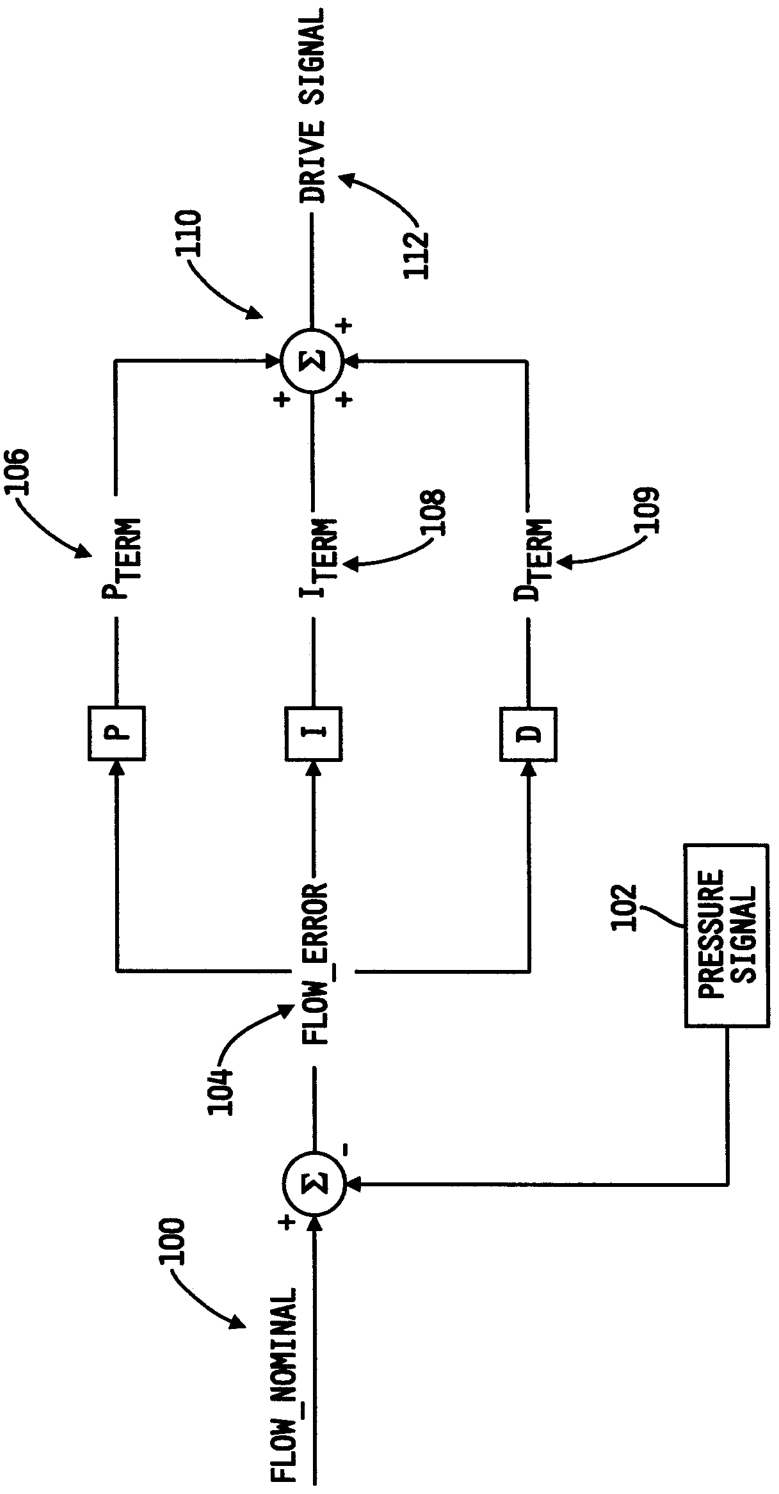
FIG. 4 is a representation of a control method for controlling the drive rate of a pump based on a rate of change of pressure in a structure being inflated by the pump.

A generalized diagram of the PID control is shown in FIG. 4. The dP/dt for a nominal flow 100 (Flow_Nominal), which may be determined by characterizing the system, is compared to the actual dP/dt calculated from the pressure signal 102 measured by the sensor 22 to determine the error term 104. The difference between the actual dP/dt and the nominal dP/dt for nominal flow 100 is the error term 104. As described below, the error term 104 is used to calculate a proportional term (Pterm) 106, an intergral term (Iterm) 108 and a derivative term (Dterm) 109. The Pterm 106, Iterm 108, and Dterm 109 are then summed at 110 to provide a drive signal 112 to the driver 26 of the pump 14. When the PID controller is invoked, the algorithm processes the pressure signal 102 from the sensor 38 to control the drive signal 112. The drive signal 112 may then be used in any of a number of ways to control the output of the pump 14. In another embodiment, a control system may monitor the difference in pressure from sensor 212 to sensor 22 and compare the actual pressure drop to a nominal pressure drop to determine the error used in the PID control. In such an embodiment, the actual pressure drop is the difference in the pressures measured by sensors 212 and 22 and the nominal pressure drop for a targeted flow rate is determined by characterizing the system.

Figure 5:
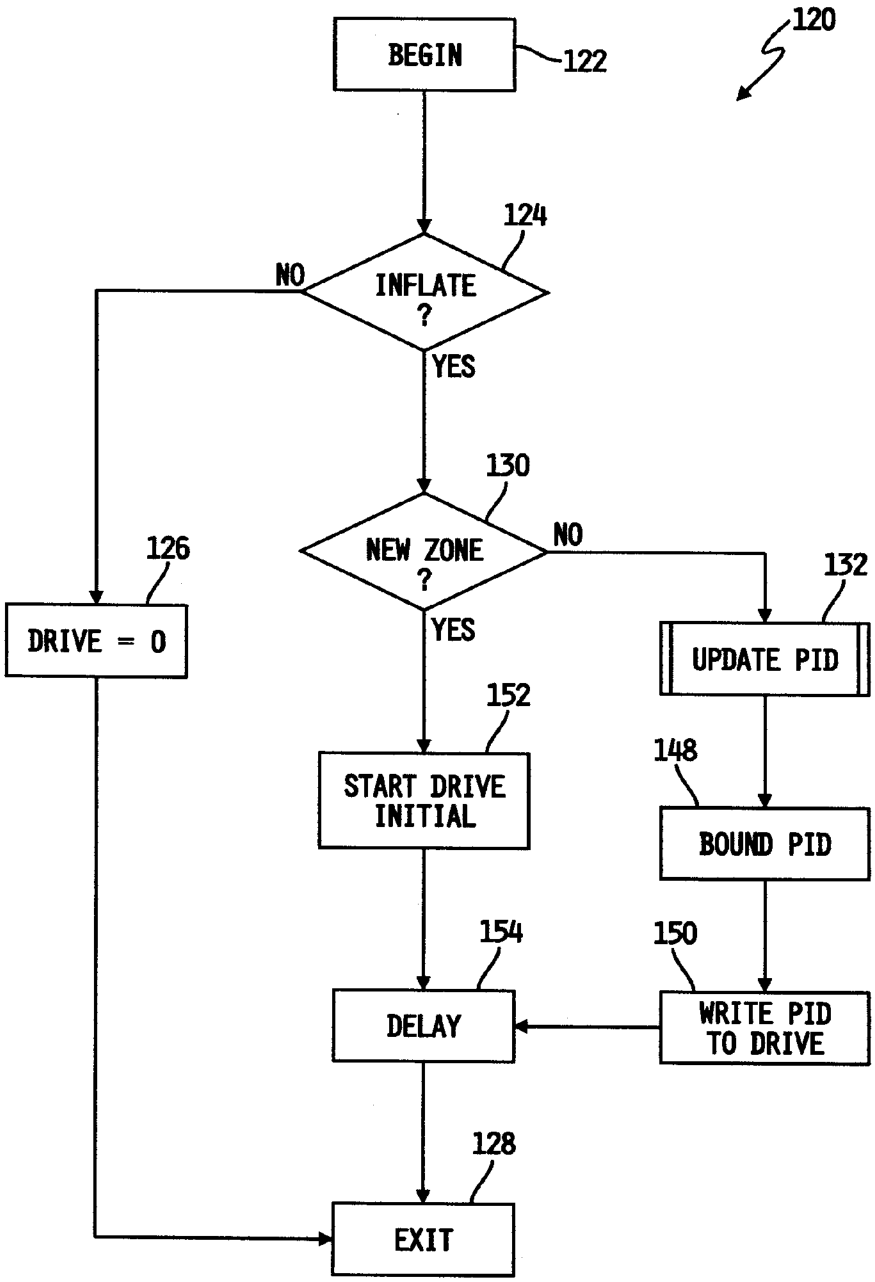
FIG. 5 is a flow chart of a control routine utilized to implement the method of FIG. 4.
Figure 6:
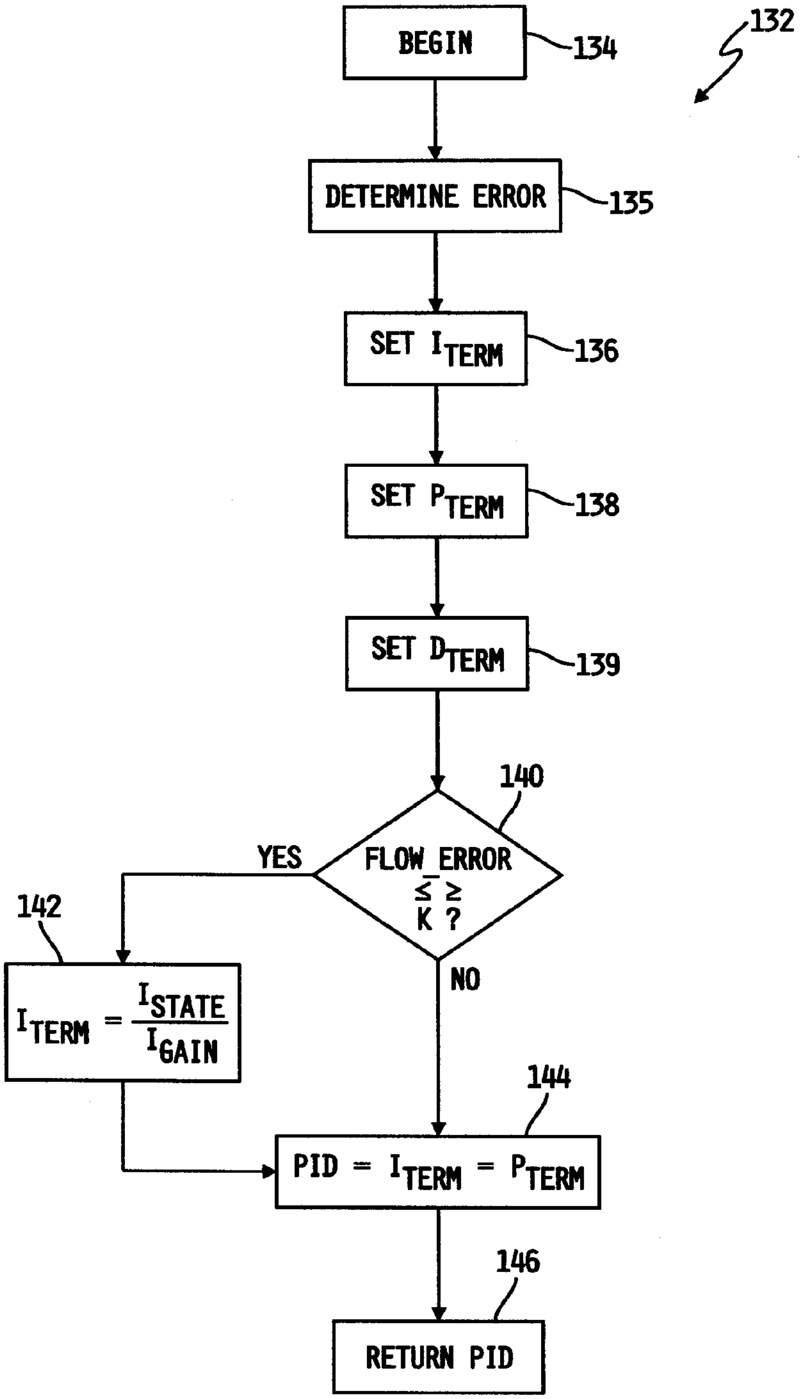
FIG. 6 is a flow chart of a subroutine called by the flow chart of FIG. 5.

An example of an embodiment of a control algorithm 120 employing the PID control of FIG. 4 is shown in FIGS. 5 and 6. It is contemplated that the illustrative control algorithm 120 will only be invoked when the inflatable support structure 12 is substantially inflated. In the case of inflatable bladders or other flexible walled structures, the applicability of the ideal gas equation is limited to conditions where the structure has an approximately constant volume. For example, during an initialization stage, the illustrative control algorithm is not used and the inflatable support structure 12 is inflated by operating the pump 14 at maximum output. Once the pressure in the inflatable support structure 12 reaches an acceptable level, the illustrative control algorithm 120 is invoked to limit the operation of the pump 14 to reduce noise and maintain the pressure in the inflatable support structure 12 under normal operating conditions.

Illustratively, the control algorithm 120 may be started every 50 milliseconds at begin step 122. The control algorithm 120 proceeds to decision step 124 where it is determined if a particular zone requires inflation. This decision is made by determining if the pressure in the inflatable support structure 12 is below threshold pressure. It is known to define a target pressure in the inflatable support structure 12 and to inflate the inflatable support structure 12 if the pressure in the inflatable support structure falls below threshold pressure which is a based on a tolerance from the target. Thus, the pressure is maintained between upper and lower threshold values that are defined based upon the target pressure. If it is determined that the particular zone does not require inflation, the control algorithm 120 proceeds to step 126 where the drive output is set to zero and the control algorithm proceeds to the exit step 128.

If the control algorithm 120 determines that the zone requires inflation at step 124, then the control algorithm 120 proceeds to step 130 to determine if the particular zone is a new zone requiring inflation. If it is not, meaning that the zone is currently being inflated, then the control algorithm 120 proceeds to subroutine 132 where the PID is updated. Referring now to FIG. 6, the PID update subroutine 132 begins at step 134 and proceeds to step 135 where the flow error 104 designated as Flow_Error is determined according to equation 6 below. In the illustrative embodiment, the flow error term 104 is equal to the nominal flow minus the current dP/dt as shown in equation 6.

$$\text{Flow\_Error}=\text{Flow\_Flow\_}Nom-dP/dt \quad (6)$$

The control algorithm then proceeds to step 136 where the Iterm is set. The current Iterm is equal to the previous Iterm plus the flow error term 104 as shown in equation 7.

$$I\text{term\_current}=I\text{term\_prey}+\text{Flow\_Error} \quad (7)$$

The subroutine 132 then progresses to step 138 where the Pterm is set to the value of the flow error term 104 times a proportional gain, Pgain as shown in equation 8.

$$P\text{term}=\text{Flow\_Error}\times P\text{gain} \quad (8)$$

The subroutine 132 then proceeds to step 139 where the value of Dterm is determined according to equation 9 below. The flow error 104 is compared to the previous flow error (Flow_Error_prev) to determine a rate of change of the flow error 104. A derivative gain, Dgain is multiplied by the difference in the flow error 104 and the previous flow error to determine the derivative term, Dterm 109.

$$D\text{term}=(\text{Flow\_Error}-\text{Flow\_Error\_prev})\times D\text{gain} \quad (9)$$

The subroutine 132 then progresses to step 140 where the value of Pterm and Iterm are summed. If the value of the sum of the terms is within a certain band, the subroutine 132 advances to step 142 and the Iterm is re-set as shown in equation 10 Igain to dampen the effect of the Iterm when the error approaches zero, thereby reducing instability in the algorithm.

$$Iterm=\frac{\text{Iterm\_current}}{Igain} \quad (10)$$

If the error is outside of the band, then Iterm is set to Iterm_current and the subroutine 132 advances to step 144 where the PID value is set to the sum of the Pterm, Iterm and Dterm as shown in equation 11.

$$PI = P\text{term} + I\text{term} + D\text{term} \tag{11}$$

The subroutine 132 then advances to step 146 where the subroutine 132 returns to the control algorithm 120. The control algorithm 120 then advances to step 148 where the PID is bounded to prevent unstable operation of the driver 26. The PID value is then written to the drive circuit 24 at step 150 so that the driver 26 receives the new drive signal 112.

If the determination is made at step 130 that the inflatable support structure 12 is not being inflated, the control algorithm 120 advances to step 152 where the driver 26 is given an initial drive signal 112 that is less than the maximum output of the drive. The control algorithm 120 then advances to step 154 where a time delay is invoked. The time delay gives the driver 26 sufficient time to reach a steady state operation under the initial conditions. For example, a delay of 500 milliseconds may be invoked. At the end of the delay period, the control algorithm 120 advances to step 128 and exits until called again.

Although certain illustrative embodiments have been described in detail above, variations and modifications exist within the scope and spirit of this disclosure as described and as defined in the following claims.

The invention claimed is:

1. A person-support apparatus comprising an inflatable support structure, a variable output pump in fluid communication with the inflatable support structure, wherein the variable output pump provides a flow of fluid to the inflatable support structure, and a controller coupled to the variable output pump, the controller including a circuit having an output for controlling the output of the pump, a processor in electrical communication with the circuit and operable to vary an output of the circuit, a memory device including instructions, that when executed by the processor, cause the processor to control the circuit to vary the output of the pump to maintain a constant flow from the pump, wherein the person-support apparatus further comprises a first sensor operable to sense a pressure in the inflatable support structure and to communicate a signal indicative of the pressure in the inflatable support structure to the processor, wherein the processor includes instructions that, when executed by the processor, control the output of the pump by using the time rate of change of pressure in the inflatable support structure to determine an error term, calculate an integral term of a proportion integral control based on the error term, calculate a proportional term of a proportional integral control based on the error term, adjust the gain of the integral term if the error term has a magnitude less than a threshold, and vary the output of the pump based on the proportional integral value.

2. The person support apparatus of claim 1, wherein the processor processes the signal indicative of the pressure in the inflatable support structure and varies the output of the pump based on the signal indicative of the pressure in the inflatable support structure.

3. The person support apparatus of claim 2, wherein processor controls the circuit to maintain an output pressure of the pump to a value higher than the pressure in the inflatable support structure during inflation of the inflatable support structure.

4. The person support apparatus of claim 3, wherein the circuit output is a pulse-width modulated power signal to the variable output pump to vary the operation of the pump to control the pressure output by the variable output pump.

5. The person support apparatus of claim 4, wherein the flow from the pump is maintained at a substantially constant rate during operation of the pump.

6. The person support apparatus of claim 1, wherein the person support apparatus includes a second sensor operable to sense a pressure at an outlet of the pump and to communicate a signal indicative of the pressure at the outlet of the pump to the processor, wherein the controller proportionally increases the output of the pump based on the difference in the pressure measured by the first sensor and the second sensor.

7. The person support apparatus of claim 1, wherein the pump is operated such that a pressure gradient between the pump and the inflatable support structure is substantially constant during operation of the pump.

8. The person support apparatus of claim 7, wherein the controller provides a pulse-width modulated drive signal to control a rate of displacement of the pump to maintain the substantially constant pressure gradient.

9. A person support apparatus comprising an inflatable support structure, a variable output pump including an outlet in fluid communication with the inflatable support structure, a first sensor providing a signal indicative of a pressure in the inflatable support structure, a second sensor providing a signal indicative of a pressure at an outlet of the pump, and a controller operable to compare the signal from the first sensor and the signal from the second sensor to vary the output of the pump to maintain a constant flow from the pump, wherein the controller utilizes a proportional-integral-derivative control routine to vary the output of the pump, wherein an integral term of the proportional integral controller is divided by an integral gain factor if the error in the system is within a predetermined tolerance range.

10. The person support apparatus of claim 9, wherein the controller controls the output pressure of the pump to a value slightly higher than the pressure in the inflatable support structure during inflation of the inflatable support structure.

11. The person support apparatus of claim 10, wherein the pump is operated such that a pressure gradient between the outlet of the pump and the inflatable support structure is substantially constant.

12. The person support apparatus of claim 11, wherein the controller provides a pulse-width modulated drive signal to the pump to control the rate of displacement of the pump to maintain the constant pressure gradient.

13. The person support apparatus of claim 10, wherein the pump is operable in a first mode in which the rate of displacement of the pump is maximized to maximize the flow from the pump and a second mode in which the rate of displacement of the pump is varied to maintain the constant flow.

14. A person support apparatus comprising an inflatable support structure, a variable output pump including an outlet in fluid communication with the inflatable support structure, the variable output pump including a driver responsive to a drive signal, a first sensor providing a signal indicative of a pressure in the inflatable support structure, a second sensor providing a signal indicative of a pressure at an outlet of the pump, and a processor operable to provide the drive signal to vary an output of the variable output pump, a memory device including instructions, that when executed by the processor, cause the processor to compare the pressure signal from the first sensor and the pressure signal from the second sensor to determine a pressure gradient and vary the drive signal to maintain a constant flow from the pump, wherein the variable output pump is a variable displacement pump.

15. The person support apparatus of claim 14, wherein the pump is operated such that a pressure gradient between the pump and the inflatable support structure is substantially constant during operation of the pump.

16. The person support apparatus of claim 15, wherein the controller provides a pulse-width modulated drive signal to control a rate of displacement of the pump to maintain the substantially constant pressure gradient.

17. The person support apparatus of claim 14, wherein the pump is operable in a first mode in which a rate of displacement of the pump is maximized to maximize the flow from the pump and a second mode in which the rate of displacement of the pump is varied to maintain the constant flow.

18. A person-support apparatus comprising an inflatable support structure, a variable displacement pump in fluid communication with the inflatable support structure, wherein the variable displacement pump provides a flow of fluid to the inflatable support structure, a controller coupled to the variable displacement pump, the controller including a circuit having an output for controlling the output of the pump, a processor in electrical communication with the circuit and operable to vary an output of the circuit, a memory device including instructions, that when executed by the processor, cause the processor to control the circuit to vary the output of the pump to maintain a constant flow from the pump.

19. The person support apparatus of claim 18, wherein the controller utilizes a proportional-integral-derivative control routine to vary the output of the pump.

20. The person support apparatus of claim 19, wherein an integral term of the proportional integral controller is divided by an integral gain factor if the error in the system is within a predetermined tolerance range.

21. The person support apparatus of claim 18, wherein the pump is operable in a first mode in which a rate of displacement of the pump is maximized to maximize the flow from the pump and a second mode in which the rate of displacement of the pump is varied to maintain the constant flow.

* * * * *